US008882475B2

(12) United States Patent
Aritomi et al.

(10) Patent No.: US 8,882,475 B2
(45) Date of Patent: Nov. 11, 2014

(54) ELECTROMAGNETIC FLOW RATE CONTROL VALVE AND HIGH-PRESSURE FUEL SUPPLY PUMP USING THE SAME

(75) Inventors: Shunsuke Aritomi, Mito (JP); Kenichiro Tokuo, Hitachinaka (JP); Masayuki Suganami, Iwaki (JP); Akihiro Munakata, Hitachinaka (JP); Satoshi Usui, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 61 days.

(21) Appl. No.: 13/576,770

(22) PCT Filed: Aug. 16, 2010

(86) PCT No.: PCT/JP2010/063825
§ 371 (c)(1),
(2), (4) Date: Aug. 2, 2012

(87) PCT Pub. No.: WO2011/108131
PCT Pub. Date: Sep. 9, 2011

(65) Prior Publication Data

US 2012/0301340 A1 Nov. 29, 2012

(30) Foreign Application Priority Data

Mar. 3, 2010 (JP) ................................ 2010-046067

(51) Int. Cl.

| | |
|---|---|
| ***F04B 49/06*** | (2006.01) |
| ***F02M 37/04*** | (2006.01) |
| ***F16K 31/02*** | (2006.01) |
| ***F02M 59/36*** | (2006.01) |
| ***F02M 59/46*** | (2006.01) |

(52) U.S. Cl.
CPC ........... *F02M 59/366* (2013.01); *F02M 59/466* (2013.01); *F02M 2200/9069* (2013.01); *F02M 2200/502* (2013.01)
USPC ....... 417/298; 417/505; 123/506; 251/129.15

(58) Field of Classification Search
USPC .......................... 417/298, 505; 123/458, 506; 251/129.15; 335/255, 257, 261, 262, 335/279, 281
See application file for complete search history.

(56) References Cited

U.S. PATENT DOCUMENTS

| | | | | |
|---|---|---|---|---|
| 2002/0033167 | A1 * | 3/2002 | Hiraku et al. ................. | 123/456 |
| 2009/0120412 | A1 | 5/2009 | Tokuo et al. | |

FOREIGN PATENT DOCUMENTS

| | | | |
|---|---|---|---|
| JP | 2001-241369 | A | 9/2001 |
| JP | 2002-048033 | A | 2/2002 |
| JP | 2004-125117 | A | 4/2004 |
| JP | 2004-128317 | A | 4/2004 |
| JP | 2004-218633 | A | 8/2004 |
| JP | 2009-108738 | A | 5/2009 |

OTHER PUBLICATIONS

PCT International Search Report on application PCT/JP2010/063825 dated Sep. 21, 2010; 1 page.

* cited by examiner

*Primary Examiner* — Charles Freay
(74) *Attorney, Agent, or Firm* — Foley & Lardner LLP

(57) ABSTRACT

High-response and high-power electromagnetically driven flow rate control valve with flange portion forming an attracting surface on an anchor, a first peripheral surface portion having a diameter smaller than the flange portion, and a cylindrical non-magnetic area opposing an outer peripheral surface of the flange portion with a third clearance interposed therebetween are provided, and a first fluid trap portion communicating with the back pressure chamber via the third clearance is provided. When the diameter of the flange portion is enlarged in order to enlarge the cross-sectional area of the attracting surface, fuel that is displaced by the anchor is increased, but is partly absorbed in the first fluid trap portion, so that the fuel passing through the fuel channel does not increase in comparison with fuel before the diameter of the flange portion is enlarged. Accordingly, the cross-sectional area of the attracting surface may be enlarged.

17 Claims, 4 Drawing Sheets

ELECTROMAGNETIC FLOW RATE CONTROL VALVE AND HIGH-PRESSURE FUEL SUPPLY PUMP USING THE SAME

TECHNICAL FIELD

The present invention relates to an electromagnetic flow rate control valve used, for example, in a high-pressure fuel supply pump or the like configured to supply fuel to an engine at a high pressure.

BACKGROUND ART

In the related art, various methods of using a normally-open electromagnetic valve which is brought into a valve-open state when no electricity is distributed are proposed as an electromagnetic flow rate control valve of a high-pressure fuel supply pump. For example, a technique to reduce a fluid resistance by providing a through hole on an anchor (movable member) having a magnetic attracting surface to achieve high-responsiveness is disclosed in JP-A-2002-48033. Also, a technique to provide a through hole at a center portion of an anchor (movable member) having a magnetic attracting surface in a normally-close electromagnetic valve is described in JP-A-2004-125117 and JP-A-2004-128317.

CITED LIST

Patent Literature

PTL 1: JP-A-2002-48033

PTL 2: JP-A-2004-125117

PTL 3: JP-A-2004-128317

SUMMARY OF INVENTION

Technical Problem

When the structure of the related art shown in Patent Documents 1 to 3 in which the through hole is provided is employed, the hole diameter is needed to be enlarged according to the diameter of the anchor. However, in order to provide the hole in the anchor, there is a constraint due to the arrangement of a spring or a rod passing through a center and a sufficient cross-sectional area of a fuel channel may hardly be secured by the through hole.

Here, although formation of the fuel channel by a tubular clearance on an outer peripheral surface of the anchor instead of providing the hole is contemplated, the width of the tubular clearance requires a significant cross-sectional area in order to function as the fuel channel. The smaller width is preferable for the tubular clearance as the fuel channel formed on the outer peripheral surface of the anchor in order to secure a sufficient flux amount of a magnetic circuit passing through the anchor. In this manner, the both are in a trade-off relationship.

It is an object of the present invention to solve both problems which have been a trade-off, and provide an electromagnetically driven flow rate control valve which realizes securement of a responsiveness on the basis of an enlargement of a fuel channel and improvement of an attractive force by a reduction of an magnetic resistance, and a high-pressure fuel supply pump having the same mounted thereon.

Solution to Problem

In order to solve the above-described problem, the present invention mainly employs a configuration as follows.

An electromagnetically driven flow rate control valve includes an anchor movable in the axial direction together with a valve body or a rod, a back pressure chamber whose volume is increased or decreased by an action of the anchor, a fixed magnetic attracting surface opposing an attracting surface of the anchor with a first clearance interposed therebetween, and a cylindrical magnetic area portion opposing an outer peripheral surface of the anchor with a second clearance interposed therebetween, wherein the second clearance defines a fuel channel to the back pressure chamber and forms a magnetic circuit in cooperation with the anchor.

Preferably, a flange portion forming the attracting surface on the anchor, a first peripheral surface portion having a diameter smaller than the flange portion, and a cylindrical non-magnetic area opposing an outer peripheral surface of the flange portion with a third clearance interposed therebetween are provided, and a first fluid trap portion communicating with the back pressure chamber by the third clearance is provided.

Also preferably, the first peripheral surface portion is provided with a second peripheral surface portion having a smaller diameter integrally or as a separate member, and a second fluid trap portion communicating with the first fluid trap portion by the second clearance is provided.

Advantageous Effects of Invention

According to the present invention configured as described above, the following effects are achieved.

By enlarging the diameter of the flange portion, the cross-sectional area of the attracting surface may be enlarged. Accordingly, fuel displaced by the anchor is increased, but is partly absorbed in the first fluid trap portion, so that the fuel passing through the fuel channel does not increase in comparison with fuel before the diameter of the flange portion is enlarged. Accordingly, the cross-sectional area of the attracting surface may be enlarged without enlarging the fuel channel. In this manner, increase in magnetic resistance is reduced, and an attractive force maybe improved efficiently.

With the configuration provided with the second fluid trap portion, the fuel which cannot be absorbed in the first fluid trap portion is absorbed in the second fluid trap portion, so that the fuel flow rate flowing into a fuel port of on the downstream side thereof may be reduced. Accordingly, it is no longer necessary to enlarge the fuel port by applying a complex process to the interior of the electromagnetically driven flow rate control valve, and a further compact and simple structure is achieved.

Other objects, characteristics, and advantages of the present invention may be apparent from the description of embodiments of the present invention described below with reference to attached drawings.

DESCRIPTION OF EMBODIMENTS

Figure 1:
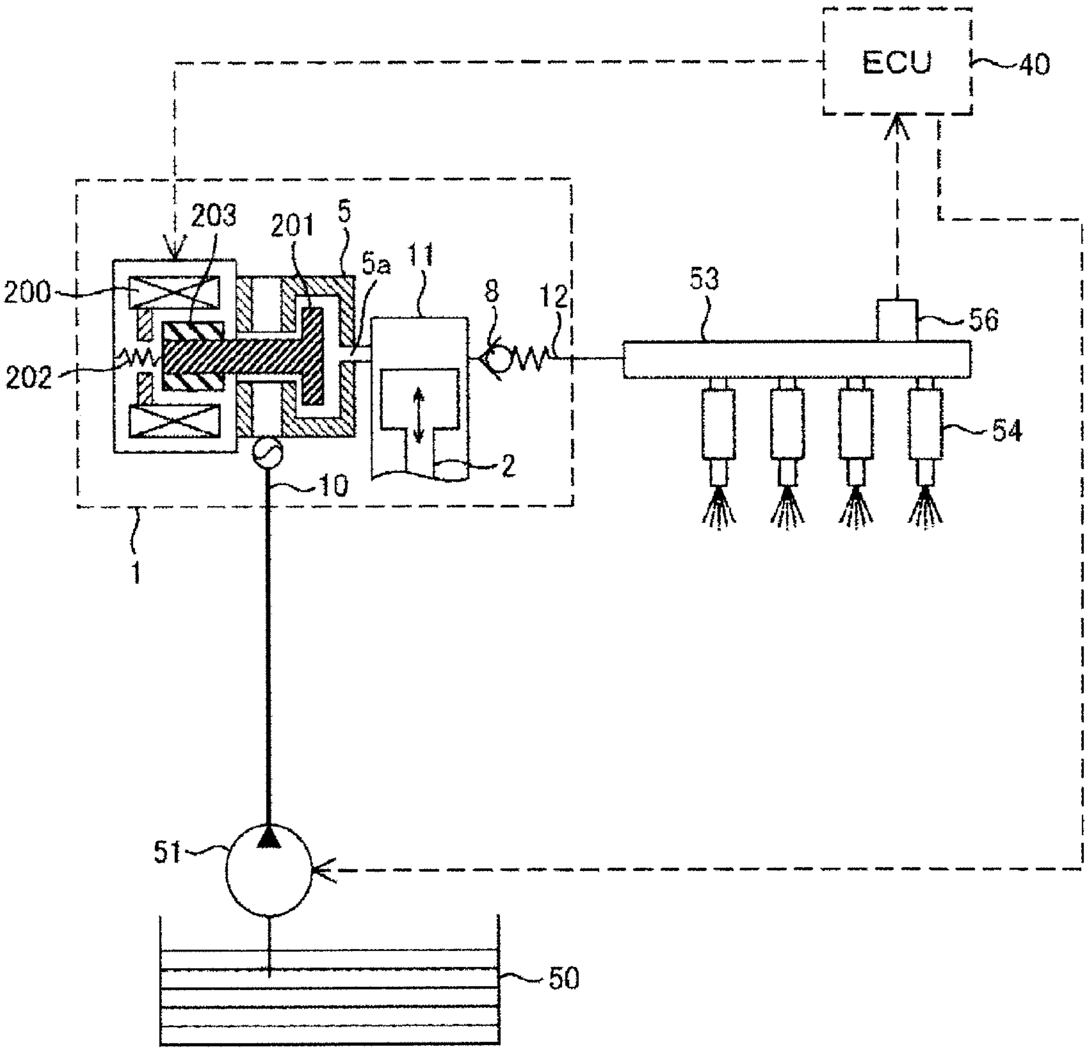
FIG. 1 shows a general configuration of a system embodied in Embodiments 1 and 2.

Referring now to the drawings, embodiments of the present invention will be described below. First of all, a back ground of the problem relating to an electromagnetic flow rate control valve of this type will be described.

Recently, downsizing and increase in power of engines are energetically carried on. In response, a high-pressure fuel supply pump is strongly required to achieve downsizing of a body in order to improve an on-board capability of the engine, and a high flow rate of discharged fuel for accommodating the higher output. From a viewpoint of reliability, securement of flow rate controllability is still one of important subjects. On the basis of the background as described above, it is required to provide a high magnetic attractive force and a high-responsive electromagnetic valve in a compact and simple structure. In general, it is necessary to increase the cross-sectional area of a magnetic attracting surface in order to increase a magnetic attractive force and, accordingly, the diameter of an anchor is also enlarged. Therefore, the amount of fuel which must be displaced when the anchor moves in an electromagnetic valve filled with fuel is increased and hence the cross-sectional area of a fuel channel must be increased under the constraint of downsizing, which makes securement of responsiveness difficult.

Embodiment 1

FIG. 1 shows a general configuration of a system employing a normally-open electromagnetic valve which is embodied in Embodiment 1 and Embodiment 2 of the present invention. A portion surrounded by a broken line shows a pump housing 1 of a high-pressure fuel supply pump, which includes a mechanism and components within the broken line integrated therein. The pump housing 1 is formed with an intake port 10, a compressing chamber 11, and a fuel discharging channel 12. The intake port 10 and the fuel discharging channel 12 are provided with an electromagnetic valve 5 and a discharge valve 8, and the discharge valve 8 is a check valve which confines the direction of flow of fuel. Also, the electromagnetic valve 5 is held in the pump housing 1 between the intake port 10 and the compressing chamber 11, and an electromagnetic coil 200, an anchor 203, and a spring 202 are arranged. An urging force in a valve-opening direction is applied to a valve body 201 by the spring 202. Therefore, when the electromagnetic coil 200 is in an OFF state (no power is distributed), the valve body 201 is in the valve-opened state. The fuel is introduced from a fuel tank 50 into the intake port 10 of the pump housing 1 by a feed pump 51. Then, the fuel is compressed in the compressing chamber 11 and is pumped from the fuel discharging channel 12 to a common rail 53. Injectors 54 and a pressure sensor 56 are mounted on the common rail 53. The number of injectors 54 mounted thereon corresponds to the number of cylinders of the engine, and injection is performed on the basis of a signal from an engine control unit (ECU) 40.

On the basis of the configuration described above, an action of the high-pressure fuel supply pump in the embodiment will be described below.

A plunger 2 changes the capacity of the compressing chamber 11 by a reciprocal movement by a cam rotated by an engine cam shaft or the like. When the valve body 201 is closed during a compressing step (a rising step from a bottom dead center to a top dead center) of the plunger 2, the pressure in the compressing chamber 11 rises, whereby the discharge valve 8 is automatically opened and the fuel is pumped to the common rail 53.

Here, when the electromagnetic coil 200 is OFF, the valve body 201 is urged by the spring 202 so as to maintain the valve-opened state even when the plunger 2 is in the compressing step.

When the electromagnetic coil 200 maintains an ON (power distribution) state, an electromagnetic attractive force which is equal to or larger than the urging force of the spring 202 is generated, and the valve body 201 is closed in order to attract the anchor 203 toward the electromagnetic coil 200. Accordingly, the fuel of an amount corresponding to the amount of reduction of the capacity of the compressing chamber 11 pushes and opens the discharge valve 8 and is pumped to the common rail 53.

In contrast, when the electromagnetic coil 200 maintains the OFF state, the valve body 201 is held in the valve-opened state by the urging force of the spring 202. Therefore, in the compressing step as well, the pressure in the compressing chamber 11 is maintained in a low-pressure state, which is substantially the same as that at the intake port 10, and hence cannot open the discharge valve 8, and the fuel of an amount corresponding to the amount of capacity decrease of the compressing chamber 11 passes through the electromagnetic valve 5 and returned back toward the intake port 10. This step is referred to as a returning step.

By using the electromagnetic valve 5 which acts as described above, the fuel is pumped to the common rail 53 immediately after the electromagnetic coil 200 is brought into the ON state halfway through the compressing step. Here, by adjusting the timing to turn into the ON state, the flow rate discharged by the pump can be controlled.

Also, since the pressure in the compressing chamber 11 is increased once the pumping is started, even when the electromagnetic coil 200 is turned into the OFF state thereafter, the valve body 201 maintains the closed state and is automatically opened synchronously with the start of an intake step (a lowering step from the top dead center to the bottom dead center) of the plunger 2.

Figure 2:
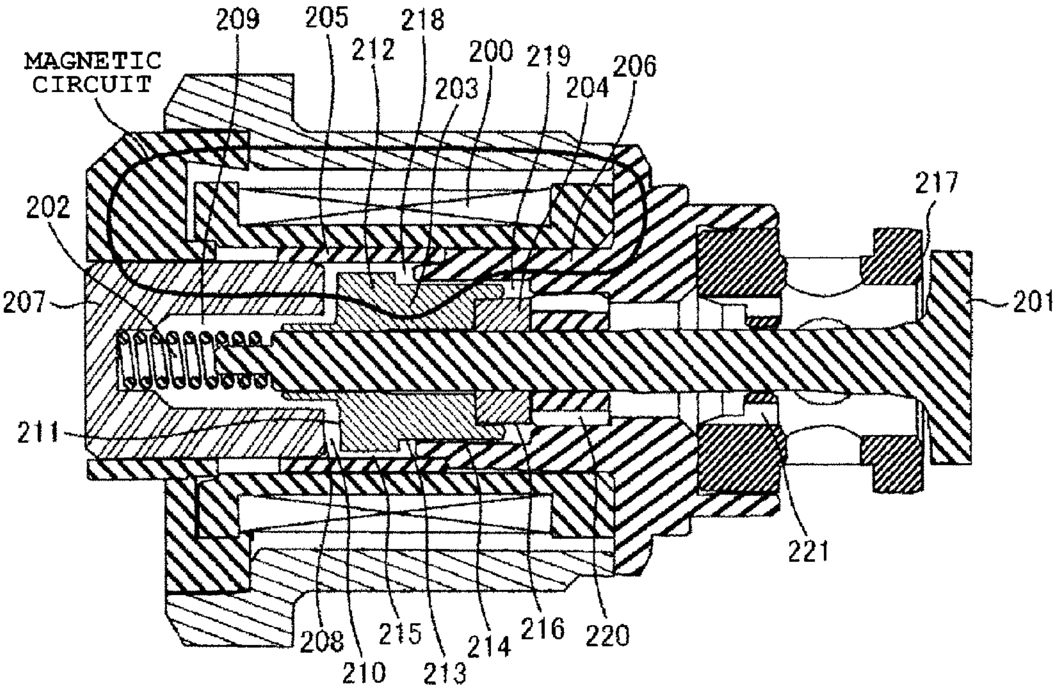
FIG. 2 is a cross-sectional view of an electromagnetic valve (when the valve is opened) according to Embodiment 1 of the present invention.

FIG. 2 shows a cross section of the electromagnetic valve according to Embodiment 1 of the present invention in the opened state. In FIG. 2, reference numeral 200 designates the electromagnetic coil, reference numeral 201 designates the valve body, reference numeral 202 designates the spring, reference numeral 203 designates the anchor, reference numeral 204 designates a stopper, reference numeral 205 designates a cylindrical non-magnetic area portion, reference numeral 206 designates a cylindrical magnetic area portion, and reference numeral 207 designates a core, respectively. Subsequently, an action of the electromagnetic valve will be described. The valve body 201, the anchor 203, and the stopper 204 are supported so as to be slidable in the axial direction and act integrally. The valve body 201 is urged by the spring 202 in the valve-opening direction, and is confined in stroke by the stopper 204 embedded into the anchor 203 coming into contact with the interior of the electromagnetic valve, and this state is the maximum valve-opened state of the valve body 201.

A fixed magnetic attracting surface 208 is formed on the surface of the core 207, and a back pressure chamber 209 which is increased and decreased in volume by the action of the valve body 201 is formed in the interior thereof. The anchor 203 is formed with an attracting surface 211 opposing the fixed magnetic attracting surface 208 via a first clearance 210, and is further formed with a first peripheral surface portion 213 smaller in diameter than a flange portion 212. The first peripheral surface portion 213 opposes the cylindrical magnetic area portion 206, and a second clearance 214 is formed therebetween. In the same manner, an outer peripheral surface of the flange portion 212 and the cylindrical non-magnetic area portion 205 oppose each other, and a third clearance 215 is formed therebetween. Furthermore, an outer peripheral surface of the stopper 204 is smaller in diameter than the first peripheral surface portion 213, and a second peripheral surface portion 216 is formed thereon. In this configuration, a first fluid trap portion 218 communicating the back pressure chamber 209 via the first clearance 210 is defined by the third clearance 215 and a second fluid trap portion 219 communicating with the first fluid trap portion 218 is defined by the second clearance 214. For reference, the first fluid trap portion 218 and the second fluid trap portion 219 are characterized in that the volumes are increased and decreased in a phase opposite from the back pressure chamber 209 when the anchor 203 is moved in the axial direction.

When the electromagnetic coil 200 of the electromagnetic valve 5 described above is turned ON, part of the magnetic circuit is formed to pass through the core 207, the fixed magnetic attracting surface 208, the first clearance 210, the attracting surface 211, the anchor 203, the first peripheral surface portion 213, the second clearance 214, and the cylindrical magnetic area port ion 206 as shown in FIG. 2. Then, a magnetic attractive force generated between the fixed magnetic attracting surface 208 and the attracting surface 211 overcomes the urging force of the spring 202, and hence the anchor 203 and the valve body 201 move in a valve-closing direction, and stops at a position where the valve body 201 comes into contact with a valve seat 217, thereby assuming a valve-closing state. In this case, the fixed magnetic attracting surface portion 208 and the attracting surface 211 do not contact with each other, and a limited space exists in the first clearance 210. When the anchor 203 moves in the valve-closing direction, the fuel displaced from the back pressure chamber 209 passes through the first clearance 210, the third clearance 215, and the first fluid trap portion 218 and flows into the second clearance 214.

Here, the possible lowest the magnetic resistance is preferable to be generated at positions other than the first clearance 210 as an air gap between the magnetic attractive surfaces, because improvement of the attractive force is achieved efficiently. However, since the magnetic circuit passes through the second clearance 214, a large magnetic resistance is generated therein. In order to avoid this, the second clearance 214 may be reduced. On the other hand, however, the second clearance 214 also serves as a channel for the fuel displaced from the back pressure chamber 209. Therefore, when the attracting surface 211 is enlarged for the purpose of increasing the attracting force in particular, it is preferable to secure a sufficiently large cross-sectional area in terms of the achievement of the high responsiveness of the electromagnetic valve when the attracting surface 211 is enlarged for the purpose of increase of the attractive force. Generally, as described thus far, when an attempt is made to form the fuel channel on the outer periphery of the anchor 203, a portion common for the fuel channel and the magnetic circuit is formed and hence the both functions have a trade-off relationship.

However, according to the structure in this embodiment, since part of the fuel displaced from the back pressure chamber 209 is absorbed in the first fluid trap portion 218, the flow rate flowing in the second clearance 214 is reduced.

In other words, even when the cross-sectional area of the attracting surface 211 is enlarged, the amount of fuel flowing into the second clearance 214 is equal to the amount of fuel displaced by the cross-sectional area of the first peripheral surface portion 213, and does not increase. Therefore, since enlargement of the attracting surface is achieved without enlarging the fuel channel, the above-described trade-off may be cancelled.

Also, part of the fuel flowed out from the second clearance is further absorbed in the second fluid trap portion 219. Accordingly, the fuel flowing to the first fuel port 220 and the second fuel port 221 communicating with the outside of the electromagnetic valve is also reduced in the same principle as the case of the first fluid trap portion 218. Accordingly, the attracting surface may be enlarged without enlarging the fuel port to be provided in the interior of the electromagnetic valve. The selection of the position of arrangement or the shape of the fuel port is significantly confined in terms of downsizing and is a subject difficult to be solved, and hence it is significantly advantageous in terms of simplicity of work if only the attracting surface may be enlarged while the structure of the related art is maintained.

Furthermore, with the configuration described above, the third clearance 215 must only have the function as the fuel channel communicating with the first fluid trap portion 218, and hence a sufficient cross-sectional area with respect to the flow rate to be displaced from the back pressure chamber 209 maybe secured. In contrast, the second clearance 214 must only be capable of securing a minimum cross-sectional area required for allowing the fuel which is not absorbed in the first fuel trap portion 218 to pass therethrough, so that the function as the magnetic circuit is a principal function. Therefore, with the configuration in which the cross-sectional area of the third clearance is larger than the cross-sectional area of the second clearance, the functions may be assigned ideally to the respective clearances as described above.

Although the description is given on the assumption of action in the valve-closing direction, the same effects are expected also for the action in the valve-opening direction in the same principle.

To wrap up, with the configuration in this embodiment, the electromagnetic valve which achieves securement of the responsiveness on the basis of the enlargement of the fuel channel which has been the trade-off and improvement of the attracting force by the reduction of the magnetic resistance in a downsized and simple structure may be provided.

Embodiment 2

Figure 3:
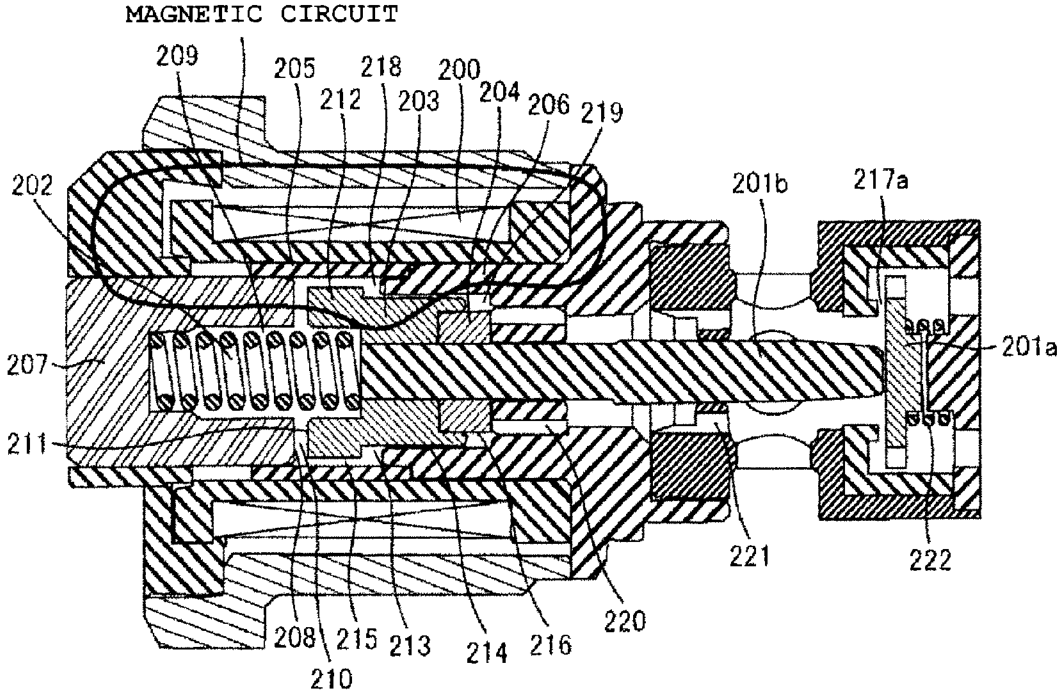
FIG. 3 is a cross-sectional view of the electromagnetic valve (when the valve is opened) according to Embodiment 2 of the present invention.

FIG. 3 shows a cross section of the electromagnetic valve according to Embodiment 2 of the present invention in the opened state. The shape of the valve body 201 is different from that in Embodiment 1 and, in this embodiment, it is divided into two members of valve body portion 201*a* and a rod portion 201*b*. The rod portion 201*b* receives an urging force from the spring 202 in the valve-opening direction and, the stroke is confined by the stopper 204 coming into contact with the interior of the electromagnetic valve. In contrast, the valve body portion 201*a* receives the urging force in the valve-closing direction by a valve body spring 222, and is pressed against a distal end of the rod portion 201*b*. Here, the urging force of the spring 202 is set to be larger than an urging force of the valve body spring 222, and in the case where the electromagnetic coil 200 is in the OFF state, a valve seat 217*a* and the valve body portion 201*a* are not in contact with each other and the valve-opening state is maintained. When the electromagnetic coil 200 is turned ON when the pump is in the compressing step, the rod portion 201*b* is moved in the valve-closing direction with the flow of the fuel in the same manner as Embodiment 1 in the interior of the electromagnetic valve 5. Then, the valve body portion 201*a* follows and is brought into the valve-closing state at a time point coming into contact with the valve seat 217*a,* whereby discharge of the pump is started. In contrast, when the pump gets to the intake step, the valve body portion 201*a* receives a differential pressure force in the valve-opening direction. The valve maybe opened with a good responsiveness because the weight is smaller in a case where the valve body 201*a* moves alone in comparison with a case where the valve body portion 201*a,* the rod portion 201*b,* and the anchor 203 moves integrally. Accordingly, a longer period is secured for the intake of the fuel, and hence the improvement of intake efficiency may be expected.

To wrap up, with the configuration of this embodiment, the same effects as Embodiment 1 may be obtained and, in addition, the responsiveness at the time of valve-opening is further improved, and hence improvement of intake efficiency is achieved.

Embodiment 3

Figure 4:
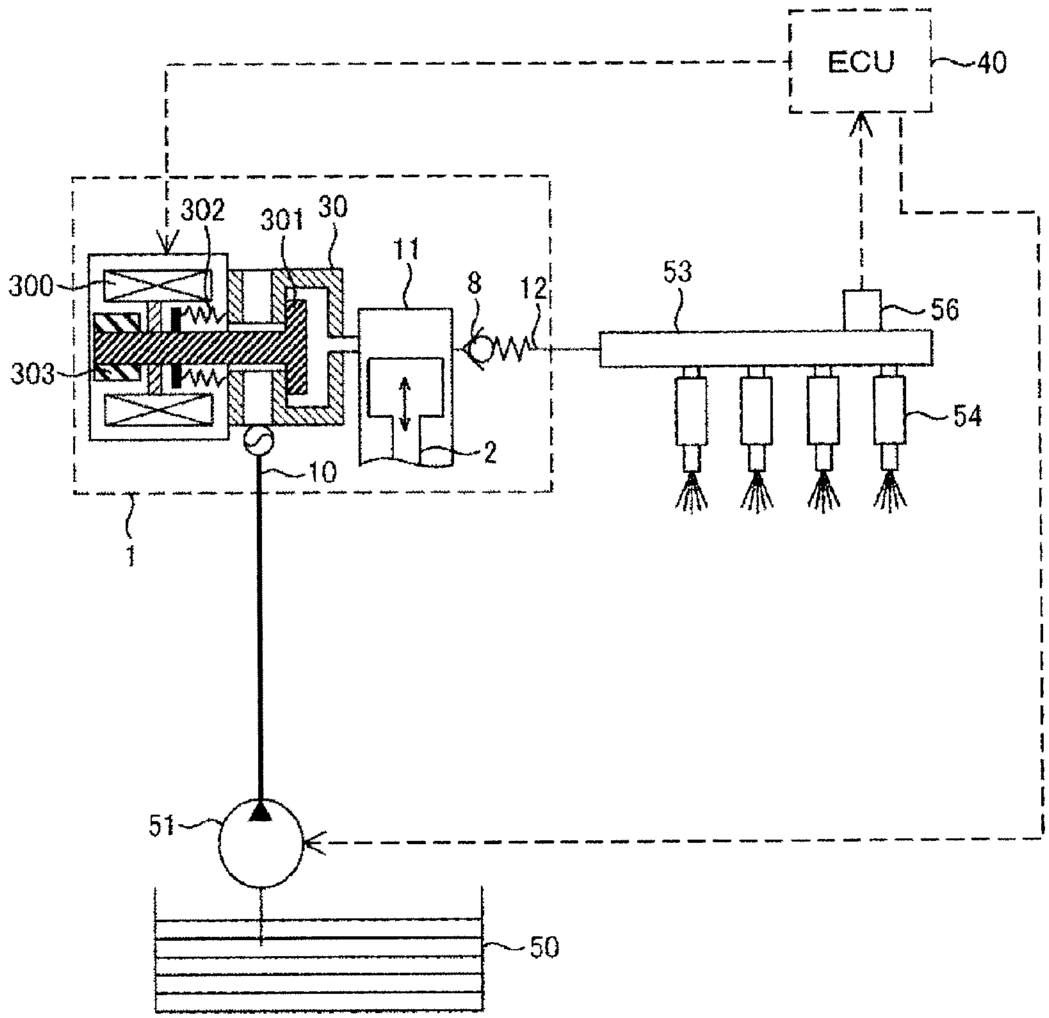
FIG. 4 shows a general configuration of a system embodied in Embodiments 3 and 4.

FIG. 4 shows a general configuration of a system employing a normally-close electromagnetic valve which is embodied in Embodiment 3 and Embodiment 4 of the present intention. Normally-close system is an electromagnetic valve system in which the valve is brought into a closed state when the electromagnetic coil is in the OFF state and is opened in the ON state in contrast to the normally-open system. In comparison with the normally-open system shown in FIG. 1, the arrangement of the components in the interior of an electromagnetic valve 30 is different. In the interior of the electromagnetic valve 30, an electromagnetic coil 300, an anchor 303, and a spring 302 are arranged. An urging force in the valve-closing direction is applied to a valve body 301 by the spring 302. Therefore, the valve body 301 is in the valve-closed state when the electromagnetic coil 300 is in the OFF state. The injector 54 and the pressure sensor 56 are mounted on the common rail 53 in the same manner as in the case of the normally-open system. The number of injectors 54 mounted thereon corresponds to the number of cylinders of the engine, and injection is performed on the basis of a signal from the engine control unit (ECU) 40.

An action on the basis of the configuration described above will be described below.

When the plunger 2 is displaced downward in FIG. 4 by the rotation of the cam in an internal combustion engine and is in the state of the intake step, the capacity of the compressing chamber 11 is increased, and the fuel pressure therein is lowered. In this step, when the fuel pressure in the interior of the compressing chamber 11 is lowered to a level lower than the pressure at the intake port 10, a force in the valve-opening direction due to the fluid pressure difference of the fuel is applied on the valve body 301. Accordingly, the valve body 301 overcomes the urging force of the spring 302 and is opened, and the fuel is taken into the compressing chamber. When the plunger 2 translated from the intake step to the compressing step in this state, since a state in which the power is distributed to the electromagnetic coil 300 is maintained, and hence the magnetic attractive force is maintained and the valve body 301 is still maintained in the opened state. Therefore, in the compressing step as well, the pressure in the compressing chamber 11 is maintained in the low-pressure state, which is substantially the same as that at the intake port 10, and hence cannot open the discharge valve 8, and the fuel of an amount corresponding to the amount of capacity decrease of the compressing chamber 11 passes through the electromagnetic valve 5 and returned back toward the intake port 10. For reference, this state is referred to as the returning step.

When the power distribution to the electromagnetic coil 300 is stopped in the returning step, the magnetic attractive force having been acting on the anchor 303 is eliminated, and the valve body 301 is closed by the urging force of the spring 302 acting always on the valve body 301 and the fluid force of the returning fuel. Consequently, from the moment immediately after, the fuel pressure in the compressing chamber 11 rises together with the rise of the plunger 2. Accordingly, the discharge valve 8 is automatically opened and the fuel is pumped to the common rail 53.

By using the electromagnetic valve 30 which acts as described above, the fuel is pumped to the common rail 53 immediately after the electromagnetic coil 300 is brought into the OFF state midway through the compressing step. By adjusting the timing to bring into the OFF state, the flow rate discharged by the pump can be controlled.

Figure 5:
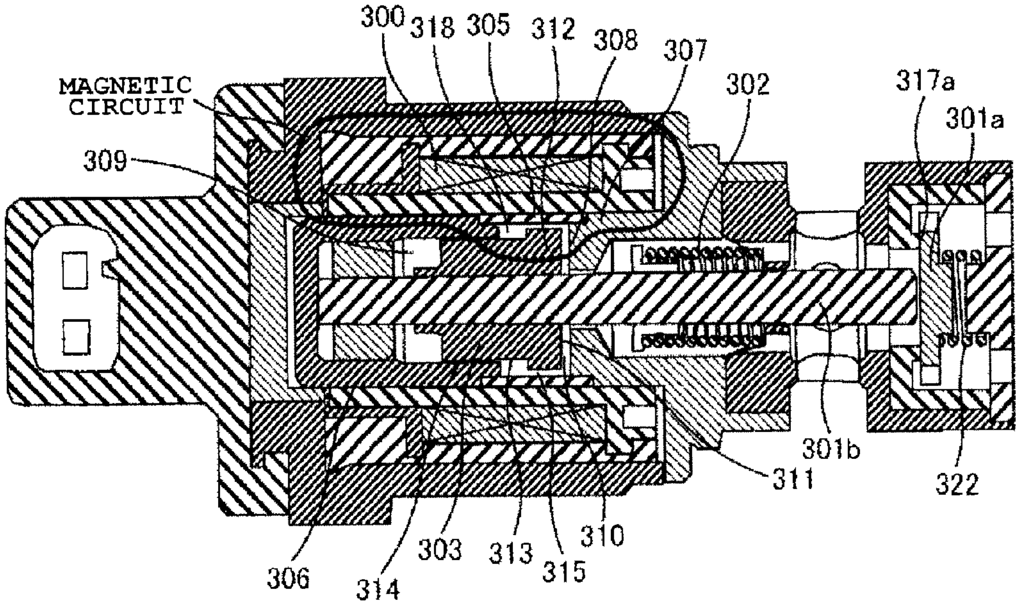
FIG. 5 is a cross-sectional view of the electromagnetic valve (when the valve is closed) according to Embodiment 3 of the present invention.

FIG. 5 shows a cross section of the electromagnetic valve according to Embodiment 3 of the present invention in the closed state. In FIG. 5, reference numeral 300 designates the electromagnetic coil, reference numeral 301*a* designates a valve body portion, reference numeral 301*b* designates a rod portion, reference numeral 302 designates the spring, reference numeral 303 designates the anchor, reference numeral 305 designates a cylindrical non-magnetic area portion, reference numeral 306 designates a cylindrical magnetic area portion, and reference numeral 307 designates a core, respectively. Subsequently, the action of the electromagnetic valve will be described. The rod portion 301*b* receives the urging force from the spring 302 in the valve-closing direction and, when the electromagnetic coil 300 is in the OFF state, the stroke is confined by an end portion coming into contact with the interior of the electromagnetic valve. In addition, the valve body portion 301*a* receives an urging force in the valve-closing direction by a valve body spring 322, and is pressed against a valve seat 317*a,* and the valve-closing state is maintained. When the pump gets to the intake step, the valve body portion 301*a* receives a differential pressure force in the valve-opening direction. When the valve is opened, an attracting surface 311 formed on the anchor 303 comes into contact with a fixed magnetic attracting surface 308 formed on the core 307, so that the stroke is constrained and the maximum valve-opening state is assumed.

Also, a back pressure chamber 309 which is increased and decreased in volume by the action of the anchor 303 is formed in the interior of the member which forms the cylindrical magnetic area portion 306. In addition, the first clearance is formed between the fixed magnetic attracting surface 308 and the attracting surface 311. The anchor is formed with a first peripheral surface portion 313 smaller than a flange portion 312 in diameter. The first peripheral surface portion 313 opposes the cylindrical magnetic area portion 306, and a second clearance 314 is formed therebetween. In the same manner, an outer peripheral surface of the flange portion 312 and the cylindrical non-magnetic area portion 305 oppose each other, and a third clearance 315 is formed therebetween. In this configuration, a first fluid trap portion 318 extending from the third clearance 315 via a first clearance 310 and communicating with the back pressure chamber 309 is provided.

When the electromagnetic coil 300 of the electromagnetic valve 30 described above is turned ON, part of the magnetic circuit is formed to pass through the core 307, the fixed magnetic attracting surface 308, the first clearance 310, the attracting surface 311, the anchor 303, the first peripheral surface portion 313, the second clearance 314, and the cylindrical magnetic area portion 306 as shown in FIG. 5. Then, a magnetic attractive force generated between the fixed magnetic attracting surface 308 and the attracting surface 311 overcomes the urging force of the spring 302, and hence the anchor 303 and the rod portion 301*b* move in the valve-opening direction. Then, a distal end of the rod portion 301*b* comes into contact with the valve body portion 301*a*, and the valve body portion 301*a* moves in the valve-opening direction.

The flow of the fuel when the anchor 303 is moved in the valve-closing direction will be described as an example in the track of Embodiment 1 and Embodiment 2. The fuel displaced from the back pressure chamber 309 passes through the second clearance 314, the first fluid trap portion 318, the third clearance 315, and the first clearance 310 and flows out to the outside of the electromagnetic valve.

Here, in the normally-close system as well, the same problem as in the normally-open system occurs. The possible lowest the magnetic resistance is preferable to be generated at positions other than the first clearance 310 as an air gap between the magnetic attractive surfaces, because improvement of the attractive force is achieved efficiently. However, since the magnetic circuit passes through the second clearance 314, a large magnetic resistance is generated therein. In order to avoid this, the second clearance 314 may be reduced. On the other hand, however, the second clearance 314 also serves as a channel for the fuel displaced from the back pressure chamber 309. Therefore, it is preferable to secure a sufficiently large cross-sectional area in terms of the achievement of the high responsiveness of the electromagnetic valve. As described thus far, when an attempt is made to form a fuel channel on the outer periphery of the anchor 303, a portion common for the fuel channel and the magnetic circuit is formed and hence the both functions have a trade-off relationship.

However, according to the structure in this embodiment, even when the cross-sectional area of the attracting surface 311 is enlarged, the amount of fuel flowing into the second clearance 314 is equal to the amount of fuel displaced by the cross-sectional area of the first peripheral surface portion 313, and does not increase. Therefore, since enlargement of the attracting surface is achieved without enlarging the fuel channel, the above-described trade-off may be cancelled.

Furthermore, with the configuration described above, the third clearance 315 must only have the function as the fuel channel communicating with the first fluid trap portion 318, and hence a sufficient cross-sectional area with respect to the flow rate to be displaced from the back pressure chamber 309 maybe secured. In contrast, the second clearance 314 must only be capable of securing a minimum cross-sectional area required for allowing the fuel which is displaced by the cross sectional area of the first peripheral surface portion 313 to pass therethrough, so that the function as the magnetic circuit is a principal function. Therefore, with the configuration in which the cross-sectional area of the third clearance is larger than the cross-sectional area of the second clearance, the functions may be assigned ideally to the respective clearances as described above.

Although the description is given thus far on the assumption of the action in the valve-closing direction, the same effects are expected also for the action in the valve-opening direction in the same principle.

To wrap up, with the configuration in this embodiment, the normally-close electromagnetic valve which achieves securement of responsiveness on the basis of the enlargement of the fuel channel which has been the trade-off and improvement of the attracting force by the reduction of the magnetic resistance in a downsized and simple structure may be provided.

Embodiment 4

Figure 6:
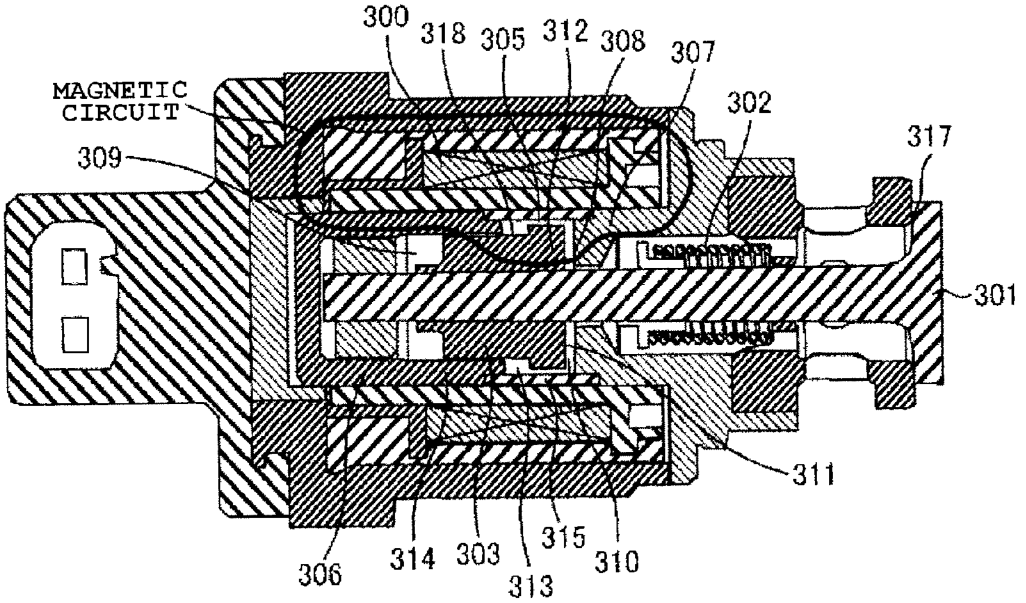
FIG. 6 is a cross-sectional view of the electromagnetic valve (when the valve is closed) according to Embodiment 4 of the present invention.

FIG. 6 shows a cross section of the electromagnetic valve according to Embodiment 4 of the present invention in the closed state. The difference from Embodiment 3 is that the valve body portion 301*a* and the rod portion 301*b* are integrated into the valve body 301. The valve body 301 is urged in the valve-closing direction by the spring 302, and when the electromagnetic coil 300 is OFF, the stroke is confined by the valve body 301 coming into contact with a valve seat 317, and hence the valve-closing state is assumed. When the electromagnetic coil is turned ON in this state, the anchor 303 moves in the valve-opening direction in association with a fuel flow in the same manner as Embodiment 3 in the interior of the electromagnetic valve 30, so that the valve body 301 is maintained in the valve-opening state. Even when the pump reaches the compressing step, the valve-opened state is maintained and hence so-called a state of the returning step is assumed. When the electromagnetic coil 300 is turned OFF here, the fluid force acting on the electromagnetic coil 300 and the urging force of the spring 302 bring the electromagnetic valve 30 in the closed state, so that discharge from the pump is started. Since the fluid force in the valve-opening direction acts on the valve body 301 when the pump is in the intake step, even when the rising responsiveness of the magnetic attractive force is delayed, the delay of the opening of the valve body does not occur, and improvement of the robustness under the flow rate control is achieved.

To wrap up, with the configuration of this embodiment, the same effects as those of Embodiment 3 maybe obtained and, in addition, even when the rising responsiveness of the magnetic attractive force is delayed, the delay of the valve opening does not occur by the assistance of the fluid force, so that further improvement of the robustness under the flow rate control is achieved.

Although the description given above has been given about Embodiments, the invention is not limited thereto, and it is apparent for those skilled in the art that various modifications or corrections may be made within the spirit of the present invention and the scope of Claims.

INDUSTRIAL APPLICABILITY

The present invention is not limited to the high-pressure fuel supply pump of the internal combustion engine, and may be used widely in various high-pressure pumps.

REFERENCE SIGNS LIST pump housing
2 plunger
5, 30 electromagnetic valve
8 discharge valve
10 intake port
11 compressing chamber
50 fuel tank
53 common rail
54 injector
56 pressure sensor

The invention claimed is:

1. A plunger-type high-pressure fuel supply pump having a cylinder provided in a pump;

a plunger slidably provided in the cylinder and configured to reciprocate in accordance with rotation of a cam;

a fluid compression chamber defined by the plunger and the cylinder;

an electromagnetic valve provided in a space defined between the compression chamber and a fluid intake channel; and a discharge valve provided in a space defined between the compression chamber and a fluid discharge channel;

wherein the electromagnetic valve includes:

an anchor movable in an axial direction together with a valve body;

a back pressure chamber configured to be increased and decreased in volume by an action of the anchor;

a fixed magnetic attracting surface opposing an attracting surface of the anchor with a first clearance interposed therebetween;

a cylindrical magnetic area portion opposing an outer peripheral surface of the anchor with a second clearance interposed therebetween, the second clearance defining a fuel channel and also forming a magnetic circuit in cooperation with the anchor;

a flange portion forming the attracting surface on the anchor;

a first peripheral surface portion smaller than the flange portion in diameter;

a cylindrical non-magnetic area portion having an outer surface with a constant diameter and opposing an outer peripheral surface of the flange portion with a third clearance interposed therebetween, the second clearance being provided on an outer periphery of the first peripheral surface portion; and a first fluid trap portion communicating with the back pressure chamber by the third clearance; and wherein the third clearance is larger than the second clearance in cross-sectional area.

2. The high-pressure fuel supply pump according to claim 1, wherein the first peripheral surface portion includes a second peripheral surface portion having a smaller diameter formed integrally or as a separate member; and a second fluid trap portion communicating with the first fluid trap portion via the second clearance.

3. The high-pressure fuel supply pump according to claim 1, wherein the second clearance and the third clearance are formed on the outer peripheral surface of the anchor.

4. The high-pressure fuel supply pump according to claim 1, wherein the valve body or a rod receives an urging force in a valve-opening direction by a spring, and that when there is no power distribution to the electromagnetic valve, a valve-opening state is maintained.

5. The high-pressure fuel supply pump according to claim 4, wherein the spring is provided in the back pressure chamber.

6. The high-pressure fuel supply pump according to claim 4, wherein the valve body includes two members of a valve body portion and a rod portion;

a first spring configured to urge the rod portion in the valve-opening direction; and a second spring configured to urge the valve body portion in a valve-closing direction; and wherein an urging force of the first spring is larger than an urging force of the valve spring.

7. The high-pressure fuel supply pump according to claim 1, wherein the valve body or a rod receives the urging force in a valve-closing direction by a spring, and wherein when there is no power distribution to the electromagnetic valve, a valve-closing state is maintained.

8. The high-pressure fuel supply pump according to claim 7, wherein the valve body includes two members of a valve body portion and a rod portion, a first spring configured to urge the rod portion in the valve-closing direction, and a second spring configured to urge the valve body portion in the valve-closing direction.

9. An electromagnetic flow rate control valve comprising:

an anchor having a flange portion formed with a magnetic attracting surface and a first peripheral surface portion smaller than the flange portion in diameter and configured to be movable in an axial direction together with a valve body or a rod;

a fixed core including a fixed side magnetic attracting surface portion opposing an attracting surface of the anchor with a first clearance interposed therebetween, a cylindrical magnetic area portion opposing the first peripheral surface portion of the anchor with a second clearance interposed therebetween, a cylindrical non-magnetic area portion having an outer surface with a constant diameter and opposing an outer peripheral portion of the flange portion of the anchor with a third clearance interposed therebetween and configured to define a magnetic channel in cooperation with the anchor; and a fluid trap portion communicating with the first clearance via the third clearance;

wherein the third clearance is larger than the second clearance in cross-sectional area.

10. The electromagnetic flow rate control valve according to claim 9, wherein the first peripheral surface portion includes a second peripheral surface portion having a smaller diameter formed integrally or as a separate member; and a second fluid trap portion communicating with the first fluid trap portion via the second clearance.

11. The electromagnetic flow rate control valve according to claim 9, wherein the second clearance and the third clearance are formed on the outer peripheral surface of the anchor.

12. The electromagnetic flow rate control valve according to claim 9, wherein the third clearance is larger than the second clearance in cross-sectional area.

13. The electromagnetic flow rate control valve according to claim 9, wherein the valve body or the rod receives an urging force in a valve-opening direction by a spring, and that when there is no power distribution to the electromagnetic flow rate control valve, a valve-opening state is maintained.

14. The electromagnetic flow rate control valve according to claim 13, further comprising:

a back pressure chamber configured to be increased and decreased in volume by an action of the anchor, wherein the spring is provided in the back pressure chamber.

15. The high-pressure fuel supply pump according to claim 13, wherein the valve body includes two members of a valve body portion and a rod portion;

a first spring configured to urge the rod portion in the valve-opening direction; and a second spring configured to urge the valve body portion in a valve-closing direction; and wherein an urging force of the first spring is larger than an urging force of the second spring.

16. The high-pressure fuel supply pump according to claim 9, wherein the valve body or the rod receives the urging force in a valve-closing direction by a spring; and wherein when there is no power distribution to the electromagnetic valve, a valve-closing state is maintained.

17. The high-pressure fuel supply pump according to claim 16, wherein the valve body includes two members of a valve body portion and a rod portion, a first spring configured to urge the rod portion in the valve-closing direction, and a second spring configured to urge the valve body portion in the valve-closing direction.

* * * * *